(12) United States Patent
van der Eerden et al.

(10) Patent No.: US 9,700,059 B2
(45) Date of Patent: Jul. 11, 2017

(54) TREATMENT DEVICE AND METHOD FOR TREATING FOOD PRODUCTS WITH CONDITIONED AIR

(75) Inventors: Hendricus Franciscus Jacobus Maria van der Eerden, Gemeri (NL); Bernardus Wilhelmus Franciscus Leferink, Nijmegen (NL); Hendrikus Cornelis Koos van Doorn, Siebengewald (NL)

(73) Assignee: STORK TITAN B V, Boxmeer (NL)

( * ) Notice: Subject to any disclaimer, the term of this patent is extended or adjusted under 35 U.S.C. 154(b) by 1417 days.

(21) Appl. No.: 11/667,070

(22) PCT Filed: Oct. 11, 2005

(86) PCT No.: PCT/NL2005/000734
§ 371 (c)(1),
(2), (4) Date: Jun. 14, 2007

(87) PCT Pub. No.: WO2006/049492
PCT Pub. Date: May 11, 2006

(65) Prior Publication Data
US 2007/0298148 A1    Dec. 27, 2007

(30) Foreign Application Priority Data
Nov. 8, 2004 (NL) ..................... 1027446

(51) Int. Cl.
A21B 1/48 (2006.01)
A21B 3/04 (2006.01)
A21B 1/40 (2006.01)

(52) U.S. Cl.
CPC ............... *A21B 1/48* (2013.01); *A21B 1/40* (2013.01); *A21B 3/04* (2013.01)

(58) Field of Classification Search
CPC .................................. A21B 1/48; A21B 3/04
(Continued)

(56) References Cited

U.S. PATENT DOCUMENTS 3,943,841 A * 3/1976 Huang ........................... 99/470
4,039,776 A * 8/1977 Roderick ..................... 219/401
(Continued)

FOREIGN PATENT DOCUMENTS

DE    30 13 330 A1    10/1981
DE    33 39 936 A1    7/1984
(Continued)

OTHER PUBLICATIONS

N. Fouquet et al, Model based PEM fuel cell state-of-health monitoring via ac impedance measurements, Sep. 22, 2006, Journal of Power Sources, vol. 159, Issue 2, Sep. 22, 2006, pp. 905-913.*

*Primary Examiner* — David Angwin
*Assistant Examiner* — John J Norton
(74) *Attorney, Agent, or Firm* — Birch, Stewart, Kolasch & Birch, LLP

(57) ABSTRACT

A treatment device for treating food products with conditioned air includes a housing with a product inlet and product outlet. The housing defines a treatment chamber. The device includes at least one conveyor means for conveying the products through the treatment chamber from the product inlet to the product outlet, an air-circulator for causing an air stream to flow through the treatment chamber, and an air-conditioning for conditioning the air stream. The air-conditioner includes a heater and a moisture-feeder. The treatment device is also provided with controllable air-discharger for discharging air from the treatment chamber. A control device controls the moisture content of the conditioned air in the treatment chamber within a range defined by a predetermined lower limit and a predefined upper limit.

9 Claims, 1 Drawing Sheet

(58) Field of Classification Search
USPC ........ 99/323.1, 453, 467, 470, 455; 165/918
See application file for complete search history.

(56) References Cited

U.S. PATENT DOCUMENTS

| | | | | |
|---|---|---|---|---|
| 4,118,181 | A | * | 10/1978 | Onodera .................... 432/121 |
| 4,167,585 | A | * | 9/1979 | Caridis et al. ............... 426/233 |
| 4,576,090 | A | * | 3/1986 | Burtea ..................... 99/443 C |
| 4,792,303 | A | * | 12/1988 | Stewart et al. ................ 432/72 |
| 4,949,629 | A | * | 8/1990 | Leary et al. ................... 99/386 |
| 5,078,120 | A | * | 1/1992 | Hwang ..................... 126/21 A |
| 5,131,841 | A | * | 7/1992 | Smith et al. ................... 432/59 |
| 5,243,962 | A | * | 9/1993 | Hwang ..................... 126/21 A |
| RE35,259 | E | * | 6/1996 | Williams ..................... 126/369 |
| 5,525,782 | A | * | 6/1996 | Yoneno et al. ............... 219/682 |
| 5,660,103 | A | * | 8/1997 | Koopman .................... 99/468 |
| 5,694,835 | A | * | 12/1997 | Mangina ...................... 99/468 |
| 6,107,605 | A | * | 8/2000 | Creamer et al. ............. 219/401 |
| 6,121,583 | A | * | 9/2000 | Hansen ....................... 219/401 |
| 6,138,660 | A | * | 10/2000 | Middleton, Jr. ............ 126/21 A |
| 6,152,024 | A | * | 11/2000 | Tippmann ..................... 99/472 |
| 6,157,006 | A | * | 12/2000 | Sickles et al. ............... 219/401 |
| 6,244,168 | B1 | * | 6/2001 | van de Vorst et al. ..... 99/443 C |
| 6,494,131 | B2 | * | 12/2002 | van de Vorst et al. ..... 99/443 C |
| 6,497,907 | B2 | * | 12/2002 | Hofer ......................... 426/233 |
| 6,521,871 | B1 | * | 2/2003 | Shelton ....................... 219/401 |
| 6,555,791 | B2 | * | 4/2003 | Lubrina et al. .............. 219/400 |
| 6,658,993 | B2 | * | 12/2003 | Kuenen ......................... 99/446 |
| 6,707,010 | B2 | * | 3/2004 | Kuenen ....................... 219/388 |
| 2001/0032549 | A1 | * | 10/2001 | Fukushima et al. ............ 99/476 |
| 2002/0029698 | A1 | * | 3/2002 | van de Vorst et al. ......... 99/477 |
| 2002/0139789 | A1 | * | 10/2002 | Kuenen ....................... 219/388 |
| 2002/0162462 | A1 | * | 11/2002 | Kuenen ......................... 99/479 |
| 2003/0167823 | A1 | | 9/2003 | Gruhbaum et al. |

FOREIGN PATENT DOCUMENTS

| | | |
|---|---|---|
| EP | 0 701 388 A2 | 3/1996 |
| EP | 804878 A1 * | 11/1997 |
| NL | 1011199 | 1/2000 |
| SU | 1692475 A1 * | 11/1991 |
| WO | WO-91-11660 A1 | 8/1991 |
| WO | WO-03/023285 A2 | 3/2003 |

* cited by examiner

TREATMENT DEVICE AND METHOD FOR TREATING FOOD PRODUCTS WITH CONDITIONED AIR

BACKGROUND OF THE INVENTION

A first aspect of the invention relates to a treatment device for treating food products, in particular in mass production, with conditioned air, comprising a housing with a product inlet and product outlet, which housing defines at least one treatment chamber, at least one conveyor means for conveying the products through a treatment chamber from the product inlet to the product outlet, air-circulation means for causing an air stream to flow through a treatment chamber, and air-conditioning means for conditioning the air stream, which air-conditioning means at least comprise heating means and moisture-feed means.

A treatment device in the form of a cooking oven for the mass production of food products is known, for example, from WO 91/11660. This known oven comprises a housing which forms a cooking chamber. An endless conveyor, which extends along a helical conveying path from a lower entry of the housing to an upper exit of the housing, is arranged in this chamber. The conveyor has a supporting surface for carrying the food products, through which the treatment medium can pass. The oven is provided with the required conduits and a fan for causing air to circulate within the cooking chamber from the bottom of the helical conveyor past steam injection means and heating means back to the top of the helical conveyor. In one embodiment, the cooking chamber is divided into a top subchamber at a high pressure and a bottom subchamber at a lower pressure, by means of what is referred to as a mezzanine floor. To reduce problems with the heat balance in this embodiment of the oven resulting from the pressure difference between the entry and exit, in particular the expulsion of heated treatment medium or the ingress of air, at the entry and exit there are discharge chimneys interacting therewith for controlling the expulsion or intake of air and in this way to reduce heat loss and to keep the pressure in equilibrium at these positions, for safety reasons. These discharge chimneys can also be used to exchange some of the heated gaseous cooking medium for a supply of fresh air, in order to maintain the desired cooking conditions, in which context the use of a cooking medium which comprises undesirable flavours or the like is avoided in cooked food products. The section of the oven which is at a high pressure is preferably provided with a chimney in which is arranged an adjustable flap controlled by a servomotor for controlling the pressure. This chimney can also be used to periodically exchange a proportion of the used cooking medium for fresh medium.

Furthermore, U.S. Pat. No. 4,949,629 has disclosed a linear oven for cooking food products, which is divided into a number of zones each having separate cooking and heating chambers. In the zones, the humidity of the air can be controlled with the aid of a control device with a sensor, control unit and steam injection means.

SUMMARY OF THE INVENTION

Treating food products, in particular meat products, with conditioned air comprises various types of treatments, each type with its own associated conditions including, inter alia, temperature, air velocity and humidity.

However, the devices which are known from the prior art are not equipped to allow these conditions to be controlled within predetermined limits, in particular with regard to the humidity. In the prior art, the monitoring of the humidity comprises controlling the humidity to the lower limit by means of a controlled injection of steam.

It is an object of the present invention to provide a treatment device for treating food products, in particular products comprising a meat mass, such as snacks and the like, with conditioned air, in which the treatment conditions, more particularly the moisture content, can be adapted to the treatment to be applied.

Yet another object of the invention is to provide a treatment device of this type which can be used to control the moisture content of the air balance.

According to the invention, a treatment device of the type discussed above is for this purpose provided with controllable air-discharge means for discharging air from the treatment chamber, and with a control device for controlling the moisture content of the conditioned air in a treatment chamber to within a range defined by a predetermined lower limit and upper limit, comprising a measurement device for measuring at least one physical variable related to the moisture content, which measurement device is connected to a control unit for controlling the moisture-feed means and the air-discharge means on the basis of a signal originating from the measurement device, which control unit is connected to the moisture-feed means and the air-discharge means.

The invention is based on the insight that for certain types of treatments it may be necessary to enable moisture to escape from the treatment chamber in a controlled way, and for other types of treatments it may be necessary to introduce moisture into the treatment chamber, in order to keep the moisture content of the conditioned air circulating in the treatment chamber within a predetermined range. This is also related to the fact that the moisture content of the products may vary when they enter the treatment device, and therefore may affect the prevailing conditions. The invention therefore makes it possible, for example for products which are to be subjected to a roasting treatment, to discharge air with a relatively high moisture content from the treatment device. This is necessary for a treatment of this type since the products which are supplied release moisture to the conditioned air in the treatment chamber as a result of evaporation. The treatment device according to the invention is in open communication with the environment via the product inlet and product outlet, so that fresh and drier ambient air can be introduced via this inlet and outlet.

In the device according to the invention, a variable which is related to the moisture content or a change in this variable is measured over the course of time, for example the dew point, absolute humidity or relative humidity. This is compared with the preset range for this variable, and then, depending on the result of this comparison, if desired moisture is introduced by actuating the moisture-feed means or moisture is discharged by actuating the controllable air-discharge means.

The device according to the invention allows the moisture balance in the treatment chamber to be controlled for each of the treatment types and product types, which makes the device versatile in use.

The treatment device according to the invention may be of any type, such as a linear oven, an oven with a paternoster system or a spiral oven, optionally with a plurality of treatment chambers or zones.

According to a preferred embodiment, the conveyor means comprises a helical conveyor which comprises a helical conveying path within the treatment chamber. It is advantageous for the helical conveyor to comprise a hollow cylindrical drum, composed of vertical bars connected to one another, which is arranged rotatably and is driven by suitable drive means, such as an electric motor. Furthermore, the helical conveyor advantageously comprises an endless conveyor belt which is guided along a helical path around the drum and has a partially open supporting surface for carrying the products. A conveyor belt of this type is carried along by the rotating drum by means of friction. It is preferable for the interior of the drum to be connected to the air-circulation means, and during operation for the conditioned air to be distributed from the circumference of the drum, preferably a circumferential section thereof, over the windings of the helical conveyor. This distribution can also be controlled with the aid of air-distribution means which are arranged in the interior of the drum. A helical conveyor of this type is described, for example, in the Applicant's Dutch patent 1011199.

According to a further preferred embodiment, the moisture-feed means are arranged at a position downstream of the air-discharge means. This effectively prevents moisture which has been supplied by the moisture-feed means from immediately being discharged if the air-discharge means were to be activated as a result of altered conditions being measured. The moisture-feed means, which are controllable, advantageously comprise steam-feed means which are connected to a steam source via a suitable system of pipes.

According to yet another preferred embodiment, the air-discharge means comprise a discharge passage, in which there is arranged a controllable flap. The controllable flap is actuated by the control unit of the control device. According to the invention, the discharge passage is advantageously located at the top side of the housing.

Advantageously, the air-circulation means comprise a circulation passage in which there is arranged a fan, the air-discharge means being connected to the circulation passage at a position downstream of the fan. More particularly, the air-discharge passage of the air-discharge means is located in the immediate vicinity of the delivery side of the fan. This embodiment makes use of the pressure of the conditioned air which has been built up by the fan or other pump means to discharge air from the device if necessary. In this embodiment, the air-discharge means do not have to have its own dedicated suction. However, to ensure sufficient withdrawal, a fan may advantageously form part of the air-discharge means. In the above-described preferred embodiment of the helical conveyor, the circulation passage comprises an open entry side which extends over part of the circumference of the conveyor belt in the helical conveying path thereof, as described in the above-referenced Dutch patent. This open side is in communication with the suction side of the fan. On its discharge side, the circulation passage is advantageously in communication with the interior of the drum of the helical conveyor.

The measurement device or at least the sensor thereof may in principle be arranged at any position within a treatment chamber, if the atmosphere in the chamber is sufficiently uniform, as will be the case with systems with good circulation and/or high air velocities.

Preferably, the measurement device is arranged at a position downstream of the air-discharge means, preferably between the air-discharge means and the discharge side of the air-circulation passage. This means that the moisture content of the conditioned air fed to the treatment chamber and therefore the products is measured.

In one embodiment, the housing comprises a tank and a cap which can be moved up and down, provided with a seal with a fluid in between, so that the treatment device is in open communication with the environment only via the product entry and product exit. The air-discharge means are preferably provided in the top of the cap.

In a particularly preferred embodiment of the treatment device according to the invention, the housing comprises at least two treatment chambers, which are connected to one another and are each provided with their own dedicated air-circulation means for causing an air stream to flow through the treatment chamber, and air-conditioning means for conditioning the air stream, which air-conditioning means at least comprise heating means and moisture-feed means, controllable air-discharge means for discharging air from the respective treatment chamber also being provided, and a control device for controlling the moisture content of the conditioned air in the respective treatment chamber to within a range defined by a predetermined lower limit and upper limit, comprising a measurement device for measuring at least one physical variable related to the moisture content, which measurement device is connected to a control unit for controlling the moisture-feed means and the air-discharge means on the basis of a signal originating from the measurement device, which control unit is connected to the moisture-feed means and the air-discharge means. In this embodiment, the moisture balance can be controlled for each of the treatment chambers, so that if desired it is possible for treatments to be carried out under different conditions in the relevant treatment chambers. The conveyor advantageously extends through each treatment chamber, although it is also possible for each treatment chamber to be provided with a dedicated conveyor, in which case products are transferred from one conveyor to the other between the treatment chambers.

In an embodiment of this type, the air-discharge means of each chamber are preferably connected to a common air-discharge passage.

According to a further preferred embodiment, the control device is designed to control the moisture content of the conditioned air on the basis of the absolute humidity when supplying moisture. If the moisture content is to be increased (controlled upwards) for a relatively high humidity, the response to conventional meters available for this purpose is more direct than control based on the dew point. In other words, the control based on absolute moisture content is faster in this range than control based on dew point. On the other hand, the control device is advantageously also designed in such a way that the moisture content of the conditioned air can be controlled on the basis of the dew point when discharging air.

A second aspect of the invention relates to a method for treating food products with conditioned air in a substantially closed treatment device, comprising a housing with a product inlet and product outlet, which housing defines at least one treatment chamber, which method comprises at least a conditioning step for conditioning air with regard to temperature and moisture content, a movement step for moving the products from the product inlet through the treatment chamber towards the product outlet, and a contact step of bringing the conditioned air into contact with the food products in the treatment chamber during the movement step, the conditioning step comprising a control step for controlling the moisture content of the conditioned air to within a range defined by a predetermined lower limit and upper limit. This method according to the invention, which is used in particular in the above-described device according to the invention, provides the same advantages as those which have already been explained above. In particular, the method allows the moisture balance in the treatment chamber to be controlled for each of the different types of treatment and types of product.

According to one embodiment of the method according to the invention, the control step comprises a measurement step of measuring at least one physical variable related to the moisture content, a calculation step for comparing the measured variable or derivative thereof with the said range defined by a predetermined lower limit and upper limit, and if necessary an adjustment step for discharging conditioned air from the treatment device at a discharge position and/or for feeding moisture to the treatment device at a feed position. Depending on the result of the comparison in the calculation step, if necessary conditioned air is discharged and/or additional moisture is supplied. The discharge position from the treatment device is advantageously the entry side of the discharge passage, as discussed above with regard to the device. The feed position for supplying moisture is the position where additional moisture is introduced into the treatment device.

The movement step preferably comprises conveying the food products along a helical conveying path within a treatment chamber. Consequently, the treatment device in which the method is carried out takes up relatively little floor space.

The conditioned air is advantageously allowed to circulate in the treatment chamber, more particularly in the manner which has already been explained with reference to the description of the device according to the invention.

The feed position for supplying moisture to the treatment device is advantageously located downstream of the discharge position for discharging conditioned air from the treatment device.

The measurement position, i.e. the position where the measurement of at least one physical variable related to the moisture content takes place in the treatment chamber, in other words the position of the measurement sensor, is advantageously located downstream of the discharge position.

As has already been explained above with regard to the position of the discharge means, the discharge position in the method is advantageously located in the top of the housing.

For upwards adjustment, the control step preferably comprises controlling the moisture content of the conditioned air to within a range of the absolute humidity defined by a predetermined lower limit and upper limit. For downwards adjustment, the control step preferably comprises controlling the moisture content of the conditioned air to within a dew point range defined by a predetermined lower limit and upper limit.

In a further preferred embodiment of the method according to the invention, the products are subjected to treatments with differently conditioned air with regard to temperature and/or moisture content in at least two different treatment chambers.

BRIEF DESCRIPTION OF THE DRAWING

The invention is explained below with reference to the appended drawing, in which the only FIGURE shows a diagrammatic view, partially in section, of a preferred embodiment of a treatment device according to the invention.

DETAILED DESCRIPTION OF THE INVENTION

Figure 1:
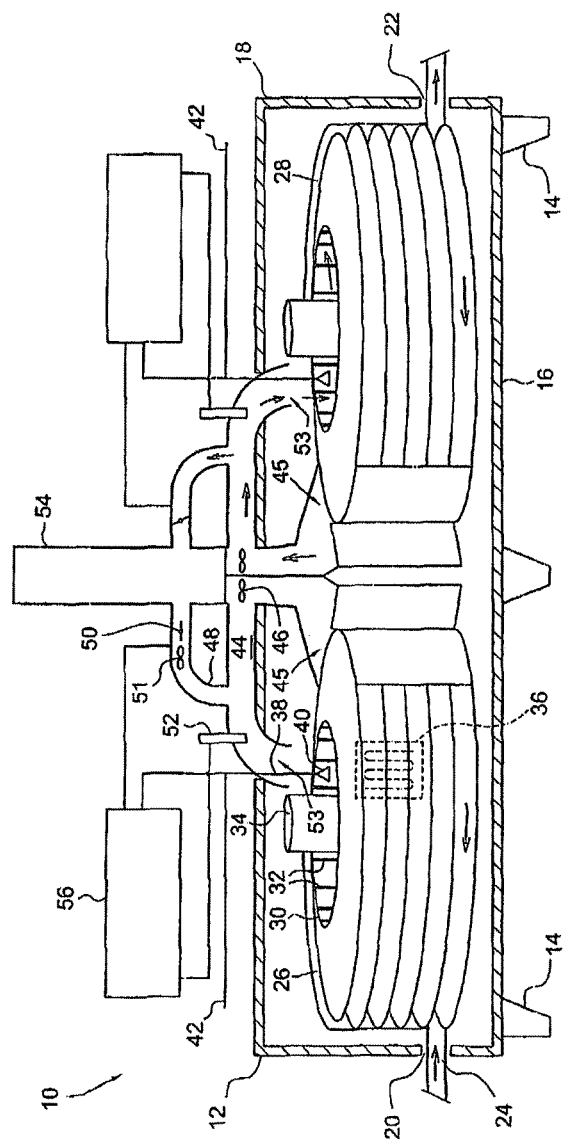

FIG. 1 illustrates an embodiment of a treatment device according to the invention in the form of a double helical oven for treating food products with conditioned air, more particularly steaming, cooking, frying or grilling meat-containing products. The treatment device is denoted overall by reference numeral 10 and comprises a housing 12 with support legs 14. The housing is composed of two parts, a tank 16 and a cap 18 which can be raised and lowered. A seal, for example a water trap (not shown) between adjacent edges of the tank 16 and cap 18, prevents the uncontrolled escape of conditioned air and/or the entry of ambient air. The housing 12 has an inlet 20 for introducing food products to be treated and an outlet 22 for discharging treated products. An endless conveyor belt 24 extends from the inlet 20 to the outlet 22. The conveyor belt 24 moves from the inlet 20 along an upward helical path within a first treatment chamber 26. At the top of the first treatment chamber 26, the belt 24 runs (for example directly or via an intermediate zone; not shown) to a second treatment chamber 28, where the belt 24 moves along a downwards helical path to the outlet 22. The first treatment chamber 26 and second treatment chamber 28 are separate from one another, apart from at a passage (not shown) for the belt 24 to be transferred from one chamber to the other, since the conditions inside the treatment chambers can be controlled separately, as will be explained in more detail below. The return part of the belt 24 is not shown, for the sake of clarity, but runs from the outlet 22 back to the inlet 20 within the tank 16.

The belt 24 is driven by drums 30, which are composed of bars 32 connected to one another. The drums 30 themselves are driven, for example, by electric motors via a geared transmission. Lifting means (not shown) for moving the cap 18 in the vertical direction with respect to the tank 16, may be provided in central columns 34.

One or more heat exchangers 36 are arranged in the annular space between a column 34 and a drum 30. By way of example, these heat exchangers are suspended from the cap 18 and are therefore arranged such that they can move with it.

Similarly, in this embodiment, steam-feed means 38, which are composed of one or more spray nozzles 40 that are in communication with a steam source (not shown) via conduit 42, are provided in this embodiment.

In this embodiment, circulation means comprise an air-circulation passage 44. The circulation passage 44 has an entry 45, which extends over part of the circumference of the spiral formed by the conveyor belt 24 in a treatment chamber 26, 28. A fan 46 is arranged in a circulation passage 44. On the delivery side of the fan 46, the circulation passage 44 is in communication with air-discharge means in the form of an air-discharge passage 48, in which controlled shut-off means—in this embodiment in the form of a flap 50—are provided, as well as a relatively small fan 51. As seen in the direction of flow, the connection between the circulation passage 44 and the discharge passage 48 is located downstream of the fan 46 and upstream of a sensor 52 for measuring the moisture content and/or relative humidity, for example the dew point and/or absolute humidity, of the circulating air. The discharge side 53 of the circulation passage 44 is in communication with the space between a column 34 and drum 30, where heating means 36 are arranged. Distribution means (not shown), which distribute conditioned air from the said space through the bars of the drum 30 over the entire inner circumference of the associated spiral or a limited section thereof, are usually arranged in the drum 30.

A discharge passage 48 opens out in a central chimney 54, which is in open communication with the environment at the top side.

The sensor 52 is connected to a control unit 56. In the control unit, a signal originating from the sensor is compared with a predetermined range for the humidity. If necessary, depending on the observed deviation, moisture is discharged by opening flap 50 and/or moisture is introduced by activating the steam-feed means 38. The control unit 56 is usually also used to set the temperature and actuate the heating means, and to set the air velocity and the conveying speed of the products.

The invention claimed is:

1. A treatment device for treating food products with conditioned air in mass production, comprising:
   a housing with a product inlet and a product outlet, which housing defines at least one treatment chamber,
   at least one conveyor for conveying the products through the treatment chamber from the product inlet to the product outlet which product inlet and product outlet are in open communication with the environment, and
   an air circulator for causing an air stream to flow through the treatment chamber, and an air conditioner for conditioning the air stream, which air conditioner comprises at least a heater and a steam feeder,
   wherein the treatment device is provided with a controllable air-discharger for discharging air from the treatment chamber to the environment, and with a control device for controlling the moisture content of the conditioned air in the treatment chamber to within a range defined by a predetermined lower limit and upper limit, the control device comprising:
      a sensor at least one sensor for measuring at least one physical variable related to the moisture content of the conditioned air in the treatment chamber,
      a control unit connected to the steam feeder and the air discharger, the control unit configured to receive a signal from the sensor and control the steam feeder and the air-discharger on the basis of the signal originating from the sensor so as to maintain the moisture content of the conditioned air in the treatment chamber within the range defined by the predetermined lower limit and the predefined upper limit by introduction of moisture with the steam feeder and discharge of moisture via the-air-discharger,
   wherein the control device is configured to control the moisture content of the conditioned air on a basis consisting of the absolute humidity when supplying moisture,
   wherein the control device is configured to control the moisture content of the conditioned air on a basis consisting of the dew point when discharging moisture,
   wherein the air-circulator comprises an air-circulation passage, the air-circulation passage being connected to a discharge passage of the air-discharger, and
   wherein as seen in the direction of flow of air in the air-circulation passage the steam feeder is arranged at a position downstream of the connection between the air-circulation passage and the air-discharge passage.

2. The treatment device according to claim 1, wherein the conveyor comprises a helical conveyor with a helical conveying path.

3. The treatment device according to claim 1, wherein the discharge passage has a controllable flap arranged therein.

4. The treatment device according to claim 1, wherein a fan is arranged in the air-circulation passage, and
   wherein the air-discharge passage is connected to the air-circulation passage at a position downstream of the fan.

5. The treatment device according to claim 1, wherein the sensor is arranged in the air-circulator at a position downstream of the connection between the air-circulation passage and the air-discharge passage.

6. The treatment device according to claim 1, wherein the air-discharger is provided in the top of the housing.

7. The treatment device according to claim 1, wherein the housing comprises:
   at least two treatment chambers, which are connected to one another and are each provided with their own dedicated air-circulator for causing an air stream to flow through the treatment chamber.

8. The treatment device according to claim 7, wherein the air-discharger of each treatment chamber is connected to a common air-discharge passage.

9. The treatment device according to claim 1, wherein the at least one sensor includes a humidity sensor and a dew point sensor.

* * * * *